United States Patent [19]
Busscher et al.

[11] Patent Number: 5,381,586
[45] Date of Patent: Jan. 17, 1995

[54] LATCH

[75] Inventors: Michael D. Busscher, Holland; Rick A. Anderson, Grand Haven, both of Mich.

[73] Assignee: Prince Corporation, Holland, Mich.

[21] Appl. No.: 8,613

[22] Filed: Jan. 22, 1993

[51] Int. Cl.6 .............................................. E05F 1/08
[52] U.S. Cl. ...................................................... 16/297
[58] Field of Search .................... 16/297; 292/DIG. 4

[56] References Cited

U.S. PATENT DOCUMENTS

| | | | |
|---|---|---|---|
| 3,854,784 | 12/1974 | Hunt et al. | 292/DIG. 4 |
| 5,060,899 | 10/1991 | Lorence et al. | |
| 5,211,431 | 5/1993 | Koizumi et al. | 292/DIG. 4 |

OTHER PUBLICATIONS

Exhibits A1–A10 are nine phogographs and a sketch of a Lexus cupholder, which cupholder was publicly shown in the U.S. by Lexus Corporation and is prior art.

Primary Examiner—P. Austin Bradley
Assistant Examiner—Chuck Y. Mah
Attorney, Agent, or Firm—Price, Heneveld, Cooper, Dewitt & Litton

[57] ABSTRACT

A latch arrangement is provided including a first stationary/component member, and at least one second member movably mounted to the first member for movement between an open position and a closed position, the second member including a wall section defining a planar track and an island defining a depression. A first spring biases the second member toward the open position. A latch is rotatably mounted on a pivot pin to the first member for oscillating movement and includes a follower mateably slideably disposed in the track. The follower is adapted to engage the depression to hold the second member in a closed position. The track includes inclined surfaces to direct the follower into the depression as the second member is moved from the open position to the closed position, and also includes inclined surfaces to direct the follower out of the depression as the second member is pressed and then released for movement to the open position. A second spring on the pivot pin holds the follower in the plane of the track, but the force of the biasing force is such that the follower is releasable out of the plane when the follower is pressed against the inclined surfaces with excessive force.

27 Claims, 4 Drawing Sheets

LATCH

BACKGROUND OF THE INVENTION

The present invention concerns a latch, and in particular concerns an improved push-open latch adapted to prevent damage to the latch upon application of excessive force.

Push-open latches are sometimes used on movably mounted vehicle components to give a luxurious look and feel to the vehicle components as they are moved. For example, a push-open latch can be combined with a biasing spring and damper to extend a cupholder movably mounted in an armrest in a uniform and aesthetic manner from a closed position to an open position by simply pressing on the cupholder. However, one problem with some push-open latches is that they tend to break if forced open from the closed position, rather than being pushed and released. Further, the latches can become damaged if the latch gets out of position such that it binds.

Thus, a latch solving the aforementioned problems is desired.

SUMMARY OF THE INVENTION

In one aspect, the invention includes a vehicle component having a housing, and a cover mounted to the housing which is movable between an open position and a closed position. A latch means is provided for releasably latching the cover in the closed position, the latch means being adapted to unlatch the cover when the cover is depressed. The latch means is detachably mounted by a mounting means so that the latch means moves to a release position in the event an opening force is applied to the cover without depressing the cover.

In another aspect, the present invention includes a latch arrangement for a vehicle component having a first member and a second member located proximate the first member. The second member defines a track including a depression. One of the first and second members is movably mounted relative to the other between an open position and a closed position. A biasing spring is provided for biasing the one member toward the open position. A latch member is movably mounted to the first member, and includes a follower which is slideably disposed within the track in the second member. The follower is adapted to engage the depression in the track to hold the one member in the closed position against the force of the biasing spring. The track is configured to direct the follower into the depression as the one member is moved from the open position to the closed position and further is configured to direct the follower out of the depression when the one member is pressed so that the one member can be moved back to the open position. A release member, connected to the latch member, is adapted to release the follower out of the track when the follower is biased against the track with an excessive amount of force so that the release member releases before the track and latch member are damaged.

These and other features and advantages of the present invention will be further understood and appreciated by those skilled in the art by reference to the following specification, claims and appended drawings.

DETAILED DESCRIPTION OF THE PREFERRED EMBODIMENT

A combination container-holder-and-ashtray component 20 (FIGS. 1-3) has a pair of latching arrangements embodying the present invention. The combination component includes a housing 22 adapted to receive a removable container holder 24 and a removable ashtray 26, and further includes push-open cover members 28 and 30 adapted with latch members 32 and 34, respectively, for latching cover members 28 and 30 in a closed position over container holder 24 and ashtray 26, respectively. Latch members 32 and 34 are adapted to releasably hold cover members 28 and 30 in the closed position and are adapted to rotatingly move to an unlatched position to release cover members 28 and 30 to the open position upon pressing each cover member. Latch members 32 and 34 are also adapted to move to an over-pressure release position if an excessive amount of force is applied to either of the latch members, in a direction against the latching of the latching arrangement.

Housing 22 (FIGS. 1-3) includes spaced sidewalls 40 and 42 interconnected by spaced walls 44, 45 and 46 and a floor 48. Walls 44 and 45 and floor 48 join with sidewalls 40 and 42 to form a pocket for receiving the insertable container holder 24. Walls 45 and 46 and floor 48 also join sidewalls 40 and 42 on the other side of wall 45 to form a pocket for receiving the insertable ashtray 26. A space 50 is provided between container holder 24 and wall 45 for receiving cover 28. Attachment flanges 52 extend laterally outwardly from housing 22 for attachment, for example, to a vehicle armrest or console.

Figure 1:
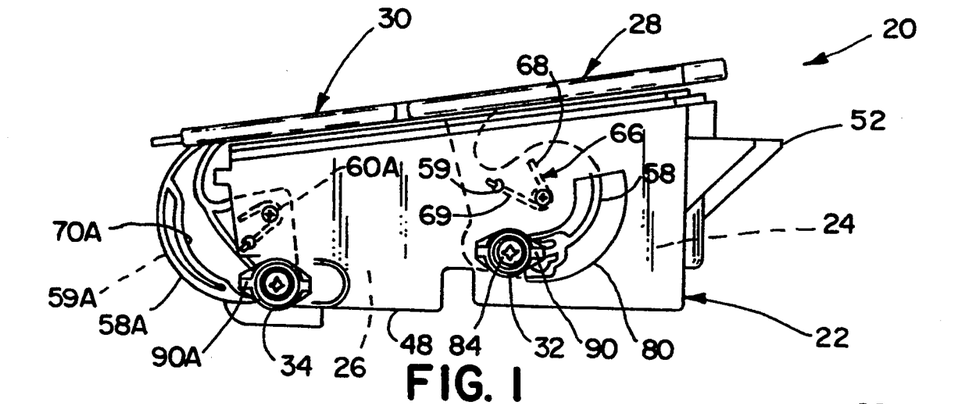
FIG. 1 is a side elevational view of a combination container-holder-and-ashtray component for a vehicle including a pair of latch arrangements shown holding a pair of covers in the closed position.
Figure 2:
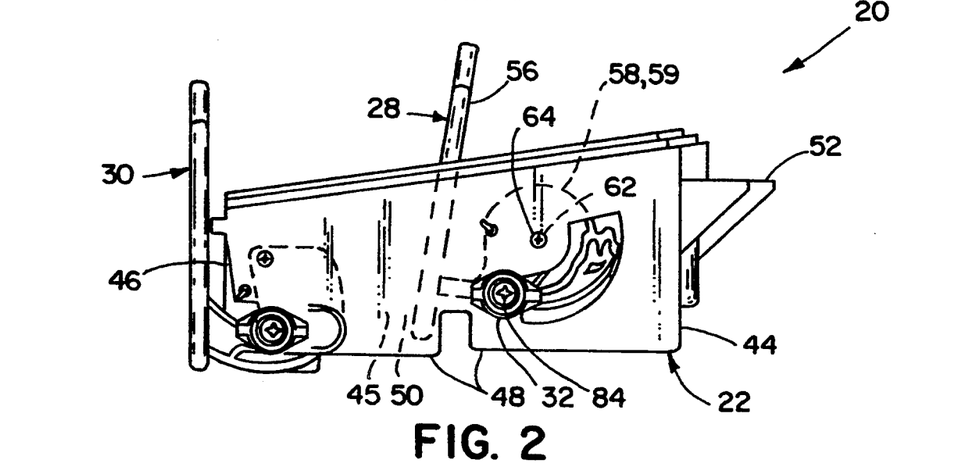
FIG. 2 is a side elevational view similar to FIG. 1 but with the covers unlatched and in an open position.
Figure 3:
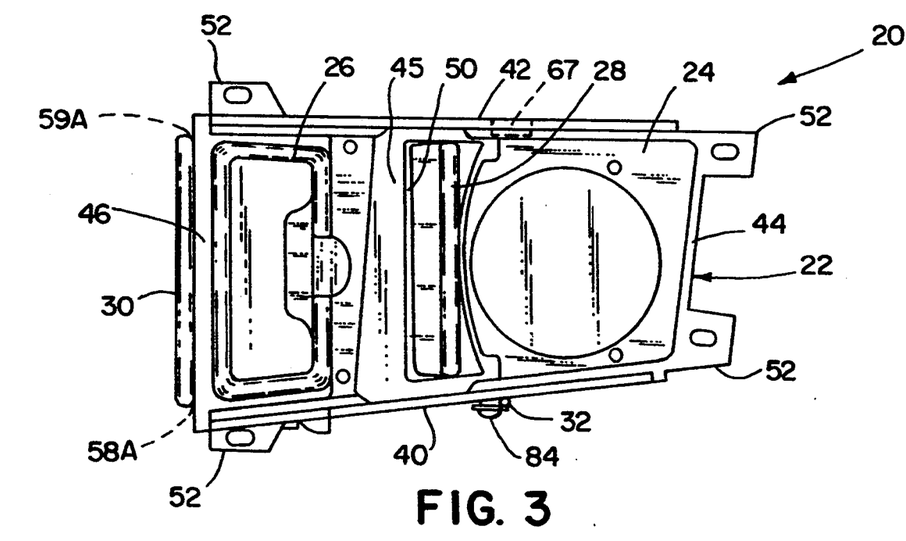
FIG. 3 is a plan view of the combination component shown in FIG. 1, with the covers in the open position.
Figure 16:
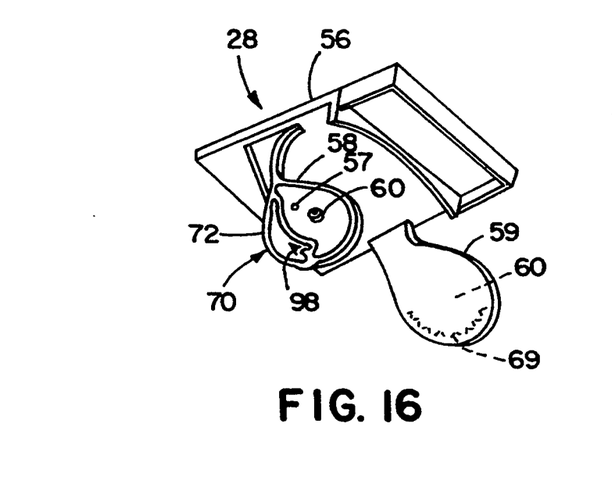
FIG. 16 is a bottom perspective view of the container holder cover.

Cover member 28 is pivotally attached to housing 22 for movement between a closed position for covering container holder 24 (FIG. 1) and an open position for uncovering container holder 24 (FIGS. 2 and 3). Cover 28 (FIG. 16) includes a top panel 56, which can be finished to conform to the overall decor of the interior of the vehicle. Cover panel 56 has spaced, arm-like sidewalls 58 and 59 depending therefrom panel 56. Sidewalls 58 and 59 lie proximate but inside of the housing sidewalls 40 and 42. A boss-like pivot member 60 is located on each of the outwardly facing side surfaces of sidewalls 58 and 59. Pivot members 60 rotatably engage a pivot-receiving aperture 62 (FIG. 2) in housing sidewalls 40 and 42 and are secured therein by a screw or other fastener 64 that is extended into the end of pivot member 60.

A coil spring 66 (FIG. 1) is positioned around pivot member 60 between cover sidewall 58 and housing sidewall 40. The ends of coil spring legs 68 and 69 are bent in opposing directions so that one of the ends engages aperture 57 in sidewall 58 and the other end engages aperture 55 in sidewall 40. This allows coil spring 66 to bias cover member 28 toward the open position. A commonly used silicon damper 67 is operably connected between sidewall 42 and cover sidewall 58 so that cover member 28 will open smoothly when released rather than snapping open.

Figure 9:
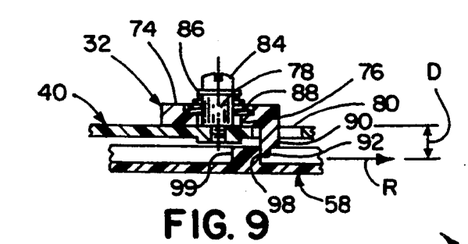
FIG. 9 is a sectional view taken along the plane IX—IX in FIG. 4.
Figure 10:
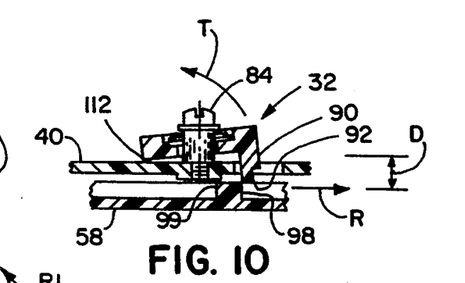
FIG. 10 is a sectional view similar to FIG. 9 but with the latch member shown in a release position, the latch member having been moved to the release position upon the application of excessive force to avoid damage to the latch member and the track.
Figure 14:
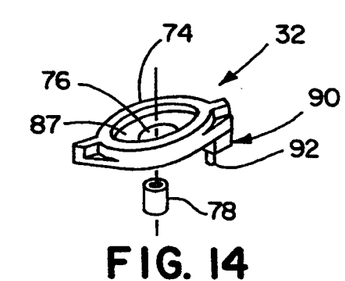
FIG. 14 is a perspective view of a latch member.
Figure 15:
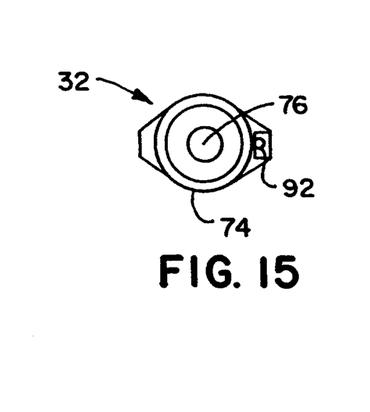
FIG. 15 is a bottom view of the latch member shown in FIG. 14.
Figure 17:
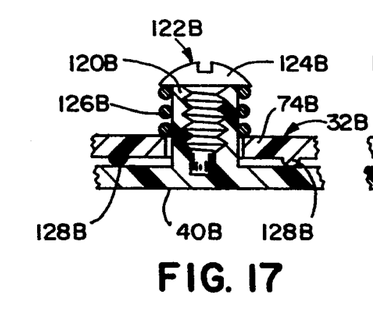
FIGS. 17-19 are alternative embodiments of the latch release mechanism.
Figure 18:
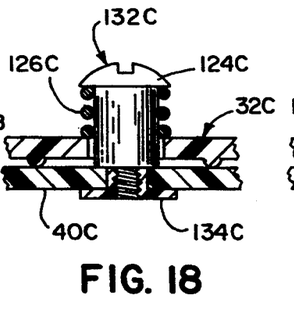
Figure 19:
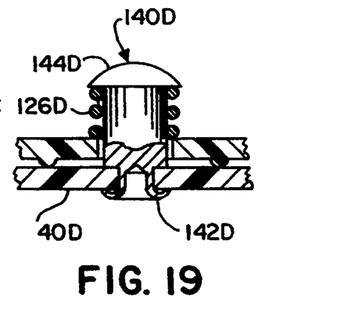

Latch member 32 (FIG. 14) includes an substantially oblong-shaped body 74 with an aperture 76 centrally located therein. A sleeve-like bearing 78 fits within aperture 76 and receives a screw or other suitable fastener 84 (FIG. 9) to rotatably mount latch member 32 to the outside of housing sidewall 40 adjacent the enlarged aperture 80 (FIGS. 1 and 9). Screw 84 preferably includes an enlarged or washered head 86 which traps a coil spring 88 in compression between head 86 and latch body 74 in a recess 87 in latch member 32, thus causing coil spring 88 to bias latch body 74 against housing sidewall 40. One end of latch member 32 overhangs aperture 80. A flat washer or lubrication (not shown) can be used to minimize friction between latch member 32 and housing sidewall 40 so that latch member 32 can move relatively freely on sidewall 40. Alternatively, protrusions can be added to the latch member to minimize friction between latch member 32 and housing sidewall 40, as shown in FIGS. 17–19. Screw 84 extends through aperture 76 and bearing 78 into housing sidewall 40. Aperture 76 is larger than bearing 78 so that latch member 32 can pivot to a skewed position relative to housing sidewall 40 as illustrated in FIG. 10 and further discussed below.

A track 70 (FIG. 16) is defined on cover sidewall 58 by a raised ridge 72 which preferably has a rectangular cross-sectional shape. Referring to FIGS. 9 and 10, a follower 90 extends from one end of latch member 32 through the enlarged aperture 80 in sidewall 40 into track 70 on sidewall 58 (FIG. 9). Follower depends into track 70 and can move within the area defined by ridge 72 as sidewall 58 rotates as cover member 24 is moved between open and closed positions. Follower 90 has an extending narrow tip portion 92 so that follower 90 can enter into narrow positions of track 70.

Figures 4, 5, 6, 7, 8:
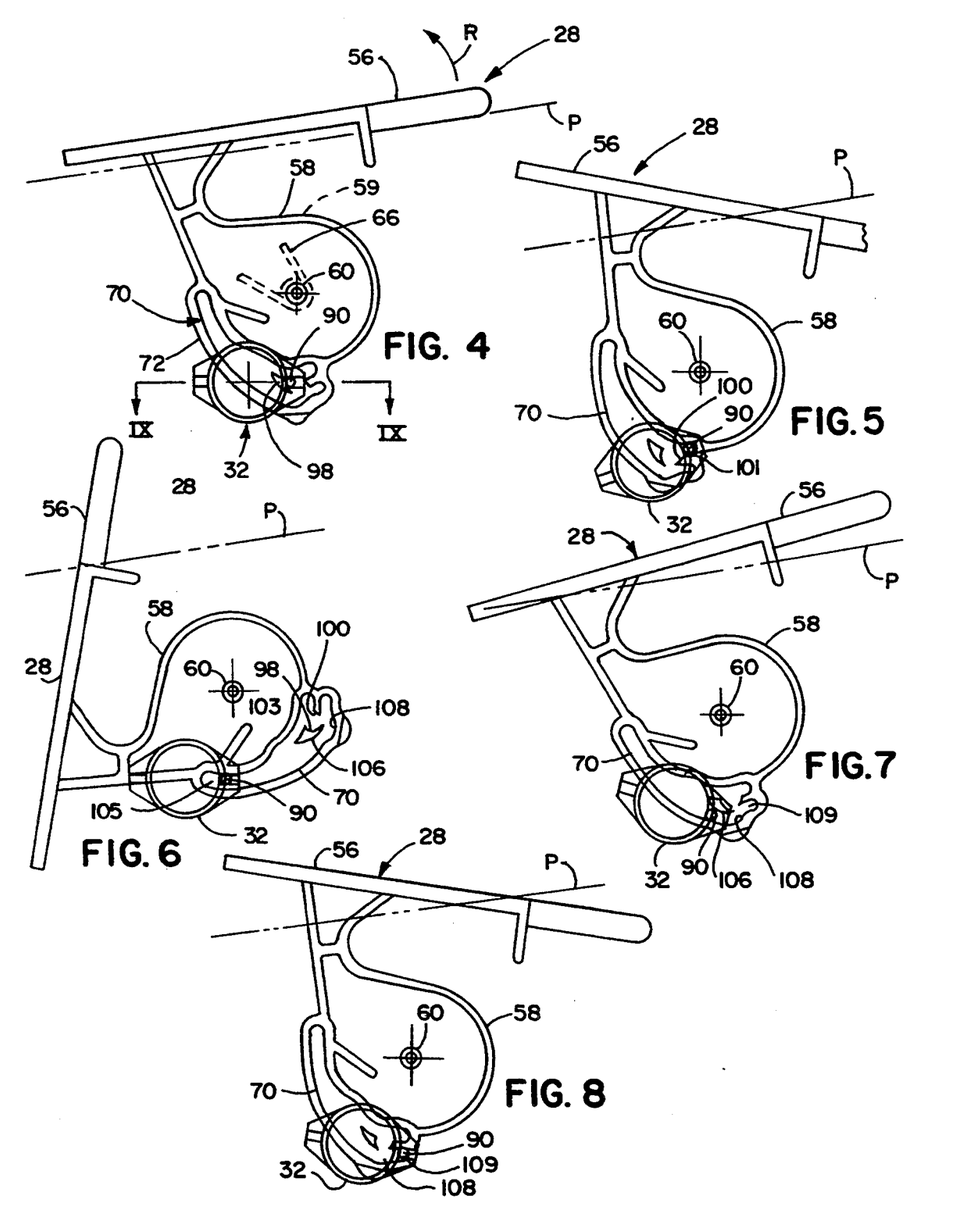
FIG. 4 is side schematic view showing one of the latch arrangements for the combination component with the associated cover shown in the closed position.
FIGS. 5-8 are side schematic views showing a latch arrangement with the associated cover shown in various orientations between open and closed positions.
Figure 16A:
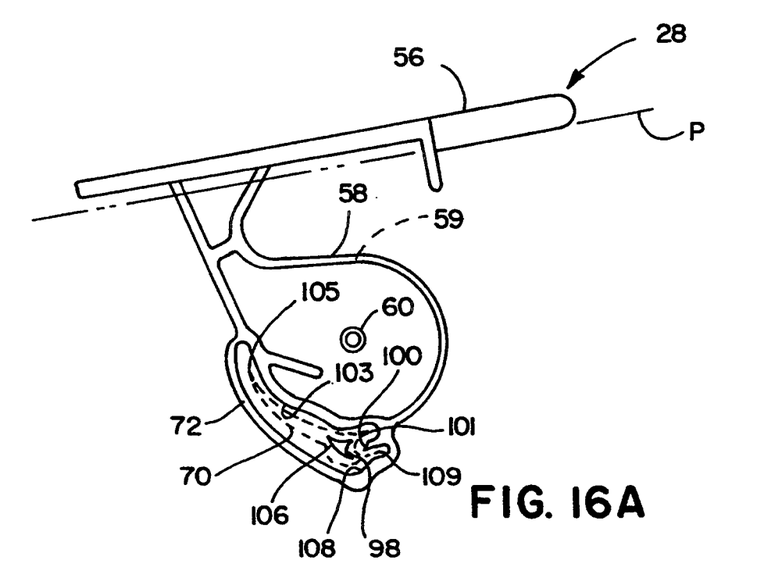
FIG. 16A is a side view of the container holder cover illustrated in FIG. 16.

Follower 90 is adapted to move about within track 70 in the following manner. For clarity, FIGS. 4–8 are drawn with latch member 32 shown as if it were transparent so that both follower 90 and track 70 are visible, however in practice, latch member 32 can be made of an opaque plastic such as nylon. With cover member 28 in the closed position as indicated by plane "P" (FIG. 4), tip portion 52 of follower 90 is located in a depression 98 in island 99. Since cover member 28 is biased by spring 66 (shown in phantom), this causes follower 90 to be held by depression 98. Thus, follower 90 of latch member 32 holds cover 28 in the closed position. When cover member 28 is pressed, an inclined first surface 100 contacts tip 52 of follower 90 and dislodges follower 90 from the depression 98 and directs follower 90 to an unlatched position 101 on track 70 (FIGS. 5 and 16A). Latch member 32 rotates counterclockwise as follower 90 moves out of depression 98 and abuts inclined surface 100. When cover member 28 is released, follower 90 slides past island 99 past portion 103 of track 70 allowing spring 66 to bias cover 28 to the open position so that follower 90 is located at position 105 at one end of the track 70 (FIGS. 6 and 16A). As follower 90 slides past portion 103, portion 103 of track 70 engages follower 90 and causes latch member 32 to rotate clockwise as shown in FIG. 6.

When cover member 28 is thereafter moved toward the closed position, against the bias of spring 66, follower 90 tends to come in contact with inclined surface 106 on island 99, inclined surface 106 causing follower 90 to rotate clockwise and move follower 90 into a corner 108 of track 70. Follower 90 continues to move as the cover 28 moves past plane P and the narrow tip 92 enters recessed portion 109 of track 70. As the closing pressure is released on cover 28 and spring 66 biases cover member 28 toward the open position, tip 92 of follower 90 moves out of recess 109 and contests the sloping surface on island 99 which directs tip 92 back to depression 98. Thus, follower 90 is again held in depression 98 causing cover 28 to remain closed.

As previously described, latch member 32 is mounted on housing sidewall 40 by a mounting means or floating pivot means (FIGS. 9 and 10). The mounting means includes bearing 78 which loosely fits within oversized hole or aperture 76 on latch member 32 so that if follower 90 is biased against ridge 72 which defines track 70, latch member 32 can move to a pivotally-skewed or over-pressure release position (FIG. 10). Specifically, FIG. 9 illustrates follower 90 normally engaging track ridge 72 such as when held in depression 98 of island 99. If cover 28 is forced from the closed position (FIG. 4) toward the open position in rotational direction "R", the force on follower 90 results in a twisting torque T on latch member 32.

Specifically, torque T is caused by an operator forcingly moving cover sidewall 58 (and island 99) in direction R, thus causing follower 90 to bias latch member 32 against pivot screw 84 and bearing 78. However, the resulting forces generated by island 99 on follower 90 and also generated by bearing 78 on latch body 74 are spaced apart a distance D. Thus, the torque T is applied to latch member 32 causing latch member 32 to move laterally to pivotally-skew upwardly to an over-pressure release position. This allows follower 90 to compress spring 88 and slide onto and over island 99 (FIG. 10). Thus, follower and latch member 32 are released to a release position and do not break. The end 112 of the latch body 74 acts as a pivot point to cause latch member 32 to pivot. Notably, latch member 28 can also move to the pivotally-skewed release position if latch member 28 is forced against any other portion of ridge 72 of track 70, although the most common situation contemplated is described above. After the torque T is removed, latch member 32 is biased back to an operational position comparable to that shown in FIG. 9, whereafter latch member 32 is again functionally positioned with follower 90 disposed in track 70.

Cover member 30 (FIGS. 1–3) is mounted to component housing 22 much like cover 28, and comparable features are identified by use of the same reference numbers but with the letter "A" used thereafter. Cover member 30 includes arm-like sidewalls 58A and 59A that are mounted to housing sidewalls 40 and 42 by pivots 60A. Cover sidewall 58A includes a track 70A comparable to track 70, track 70A being adapted to operably engage follower 90A on latch member 34 on component housing 22. Latch member 34 is mounted in an orientation that is 180° different than latch member 32. Nonetheless, as is readily apparent, latch member 34 operably engages track 70A to create a push-open latch arrangement comparable to latch member 32 and track 70, and thus the general discussion of operation need not be repeated other than as discussed below.

Figure 11:
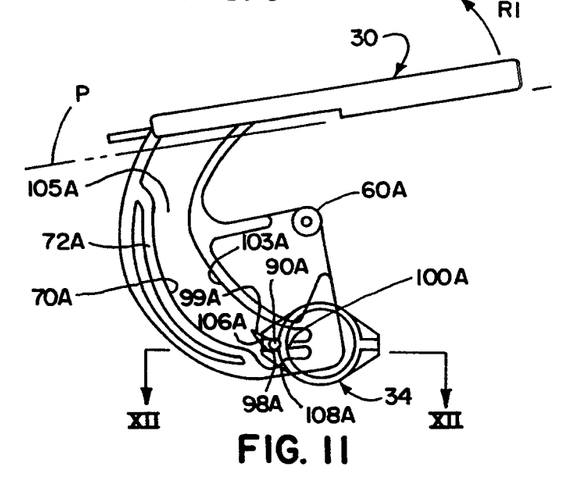
FIG. 11 is a side schematic view showing the other latch arrangement for the combination component, the associated cover being shown in a closed position.
Figure 12:
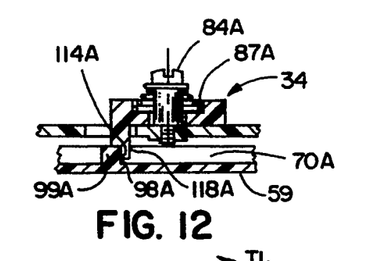
FIG. 12 is a sectional view taken along the line XII—XII in FIG. 11.
Figure 13:
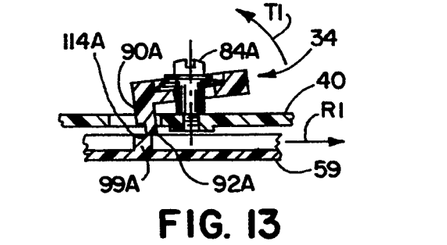
FIG. 13 is a sectional view similar to FIG. 12 but with the latch member being shown in a release position, the latch member having been moved to the release position upon the application of excessive force to avoid damage to the latch member and the track.

Latch member 34 engages track 70A in an opposite direction than latch member 32 engages track 70, as illustrated in FIG. 11. In FIG. 11, follower 90A is shown resting against depression 98A of island 99A. If for some reason cover 30 is forced in direction R1 toward the open position, a torque T1 is applied to latch member 34 causing it to move to a pivotally-skewed position as shown in FIG. 13. Specifically, the force of island 99A on follower 90A and the counteractive resulting force of latch member 34 on screw 84A generates torque T1. Torque T1 and the fulcrum-like action of latch member inner corner 114A cause latch member 34 to move to a pivotally-skewed position (FIG. 13) so that follower 98A slides upwardly out of depression 98A and over island 99. Notably, the small chamfer 118A on follower 98A also assists in moving follower 98A upwardly over ridge 72A.

It is contemplated that there are other ways of mounting latch member 32 to housing sidewall 40. For example, in FIGS. 17–19, three embodiments are illustrated, with components and features comparable to the first embodiment being shown and identified with similar numbers; but with the letters "B", "C" and "D". In FIG. 17, housing sidewall 40B includes a boss-like protrusion 120B that extends through the body 74B of latch member 32B. A screw 122B with an enlarged head 124B is threaded into protrusion 120B, and a bias spring 126B is retained in a compressed condition between head 124B and latch member 32B. Bumps 128B space latch member 32B from the outer side of housing sidewall 40B for more reduced friction therebetween. In FIG. 18, a carriage bolt or shouldered screw 132C is shown extended through latch 32C, screw 132C being threaded into nut 134C located in housing sidewall 40C. Screw 132C includes an enlarged head 124C for retaining spring 126C on latch member 32C. In FIG. 19, a shouldered rivet 140D is connected to housing sidewall 40D by crimped end 142D, rivet 140D including an enlarged head 144 for retaining a spring 126D in place, In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A vehicle component comprising:
   a housing;
   a cover mounted to said housing and movable between an open position and a closed position;
   latch means for releasably latching said cover in the closed position, said latch means being adapted to unlatch said cover when said cover is depressed in a first direction; and
   mounting means for mounting said latch means, said mounting means holding said latch means so that said latch means moves to a release position to release said cover in the event a predetermined opening force large enough to damage said latch means is applied to said cover in a second direction opposite said first direction without first depressing said cover, said mounting means including a shaft and said latch means including a latch member operably mounted on said shaft for rotational movement during normal operation of said latch means and also operably mounted on said shaft for axial movement in the event said predetermined opening force is applied in said second direction.

2. A vehicle component as defined in claim 1 wherein said latch member includes an oversized aperture having a larger diameter than said shaft of said mounting means so that said latch shaft loosely fits in said aperture to define a floating pivot.

3. A vehicle component as defined in claim 2 wherein said latch means rotates on said floating pivot when said cover is depressed and is unlatched, said latch means moving in a direction other than only rotationally on said floating pivot when an opening force is applied to said cover without depressing said cover.

4. A vehicle component as defined in claim 2 wherein said floating pivot allows said latch means to move axially as well as rotationally.

5. A vehicle component as defined in claim 4 including a bias spring that biases said latch means axially on said floating pivot.

6. A vehicle component as defined in claim 2 wherein said floating pivot defines an axis of rotation and said latch member includes a follower spaced from said axis of rotation.

7. A vehicle component as defined in claim 1 wherein said latch means is adapted to move laterally on said mounting means to the release position.

8. A vehicle component as defined in claim 7 wherein said latch means includes a follower, and one of said housing and said cover includes inclined surfaces for engaging and moving said follower to latch and unlatch said cover with said mounting means for said latch means being located on the other of said housing and said cover.

9. A vehicle component as defined in claim 1 including a pair of said covers, said latch means, and said mounting means.

10. A vehicle component as defined in claim 1 wherein said cover is spring biased to the open position.

11. A vehicle component as defined in claim 1 wherein said mounting means includes a means defining a minimum opening force that must be applied before said latch means is allowed to move to the release position.

12. A vehicle component as defined in claim 11 wherein said means defining the minimum opening force is a spring.

13. A latch arrangement for a vehicle component comprising:
- a first member;
- a second member located proximate said first member, said second member defining a track including a depression, one of said first and second member being movably mounted relative to the other of said first and said second member, said one member being movable between an open position and a closed position;
- first means for biasing said one member toward the open position;
- a shaft extending from said first member;
- a latch member including an oversized hole for loosely receiving said shaft to operably mount said latch member to said first member, said latch member further including a follower slideably disposed within said track, said follower being adapted to engage said depression and hold said one member in said closed position against the force of said first means, said track being configured to direct said follower into said depression as said one member is moved from said open position to said closed position and further being configured to direct said follower out of said depression when said one member is pressed so that said one member can be moved to said open position; and
- release means in said latch member for enabling said follower to move axially on said shaft to a released position out of said track when an excessive amount of force is applied to said latch member before said track or said latch member are damaged, said release means including said shaft on said first member and said oversized hole on said latch member.

14. A latch arrangement as defined in claim 13 wherein said release means includes a spring mounted on said shaft means for biasing said follower into an operative position relative to said track.

15. A latch arrangement as defined in claim 14 wherein said follower includes a configured tip for engaging said track, said configured tip being shaped to facilitate movement of said follower out of said track as said latch member moves to said released position.

16. A latch arrangement as defined in claim 15 wherein said second member includes a cover and a planar wall extending perpendicular to said cover section, said planar wall including said track.

17. A latch arrangement as defined in claim 13 wherein said latch member is adapted to move to a first pivotally-skewed position when an excessive amount of force is applied in a direction from said follower toward said shaft means and is adapted to move to a second pivotally-skewed position when an excessive amount of force is applied in an opposite direction from said shaft means toward said follower.

18. A latch arrangement as defined in claim 13 wherein said follower includes a configured tip for engaging said track, said configured tip being shaped to facilitate movement of said follower out of said track as said latch member moves to said skewed position.

19. A latch arrangement as defined in claim 13 wherein said second member includes a cover and a planar wall extending perpendicular to said cover section, said planar wall including said track.

20. A latch arrangement as defined in claim 13 wherein said latch member moves to a pivotally-skewed released position upon application of the excessive amount of force on said follower.

21. A latch arrangement as defined in claim 13 wherein said first member is part of a stationary vehicle component, said second member is part of a cover member for covering said first member, and said cover member is pivotally mounted to said component.

22. A latch arrangement as defined in claim 13 including:
- a third member, said second and third members being movable relative to said first member, said third member defining a second track and a second depression;
- second means for biasing said third member toward an open position;
- a second shaft extending from said third member;
- a second latch member including an oversized second hole for loosely receiving said second shaft to operably mount said second latch member to said first member, said latch member further including a second follower slideably disposed within said second track, said second follower being adapted to engage said second depression and hold said third member in a closed position against the force of said second means, said second track being configured to direct said second follower into said second depression as said third member is moved from said open position to said closed position and further being configured to direct said second follower out of said second depression when said third member is pressed so that said third member can be moved to said open position; and
- second release means in said second latch member for enabling said second follower to move axially on said second shaft to a released position out of said second track when an excessive amount of force is applied to said latch member before said second track or said second latch member are damaged.

23. A latch arrangement as defined in claim 22 wherein said second and third members form a cover for said first member.

24. A latch arrangement as defined in claim 13 wherein said first member includes a recess adapted to hold items therein and said second member is a moveable cover for said recess.

25. A latch arrangement as defined in claim 24 wherein said recess forms a container holding aperture.

26. A latch arrangement as defined in claim 13 wherein said first member is stationary and said second member is a movable cover for said first member.

27. A push-open latch arrangement for a vehicle comprising:
- a component member;
- a movable member operably mounted to said component member and including a cover portion and spaced leg-like members depending from said cover portion including means for pivotally mounting said movable member, one of said leg-like members including wall means defining a track therein, said track including an island defining a depression and further including a..plurality of inclined surfaces, said cover portion being moveable to a closed position aesthetically covering said component member and also being moveable to an open position uncovering said component member;

a spring operably connected to said moveable member to bias said moveable member toward the open position;

a latch rotatably mounted to said component member adjacent said track for oscillating rotation, said latch including a follower disposed within said track, said follower being adapted to operatively engage said track as said second member is moved, said follower os said latch being abuttingly moved by said plurality of inclined surfaces of said track into alignment with said depression as said movable member is moved to the closed position whereat said follower is adapted to engage said depression to hold said second member in said closed position, said plurality of inclined surfaces further directing said follower out of alignment with said repression when said second member is first pressed and then released from said closed position so that said second member can be moved to said open position;

release means for releasably holding said follower in an operative position in said track, said follower on said latch being biasingly held in said track by said release means at a predetermined force but being releasable from said track to a released position out of said track when said follower is pressed against said inclined surfaces with excessive force, whereby said latch cooperates with said track to retain said movable member in said closed position and also to allow said movable member to move to said open position when said movable member is pressed, but said latch is also adapted to move to the released position out of said track upon application of an excessive force so that said latch does not break: and said release means including shaft means on said component member and an oversized hole on said latch for receiving said shaft means for mounting said latch to said component member, and also including spring means for biasing said latch into an operative position in said track; said spring means, said oversized hole, and said shaft means cooperating to allow said latch to move to a pivotally-skewed position upon application of the excessive force whereat said follower is released out of said track.

* * * * *

UNITED STATES PATENT AND TRADEMARK OFFICE
CERTIFICATE OF CORRECTION

PATENT NO. : 5,381,586
DATED : January 17, 1995
INVENTOR(S) : Michael D. Busscher et al It is certified that error appears in the above-indentified patent and that said Letters Patent is hereby corrected as shown below:

Column 4, line 68;

after "follower" insert –90–.

Column 5, line 66;

"place," should be –place.–.

Column 8, line 66, Amend B;

after "a" delete –..–.

UNITED STATES PATENT AND TRADEMARK OFFICE
CERTIFICATE OF CORRECTION

PATENT NO. : 5,381,586
DATED : January 17, 1995
INVENTOR(S) : Michael D. Busscher, et al It is certified that error appears in the above-indentified patent and that said Letters Patent is hereby corrected as shown below:

Column 9, line 11, claim 27;

"os said" should be --of said--.

Column 9, line 18, claim 27;

"repression" should be --depression--.

Column 10, line 12, Amend B;

"break:" should be --break;--.

Signed and Sealed this

Twenty-sixth Day of September, 1995

Attest:

BRUCE LEHMAN

Attesting Officer     Commissioner of Patents and Trademarks